(12) United States Patent
Miura

(10) Patent No.: US 7,942,439 B2
(45) Date of Patent: May 17, 2011

(54) VEHICLE BODY MOUNT STRUCTURE OF CURTAIN AIRBAG

(75) Inventor: Kazuki Miura, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 185 days.

(21) Appl. No.: 12/364,722

(22) Filed: Feb. 3, 2009

(65) Prior Publication Data
US 2009/0194978 A1 Aug. 6, 2009

(30) Foreign Application Priority Data
Feb. 4, 2008 (JP) ................. 2008-024101

(51) Int. Cl.
*B60R 21/20* (2006.01)
(52) U.S. Cl. ................. 280/728.2; 280/743.2
(58) Field of Classification Search ......... 280/728.2, 280/730.2, 743.2
See application file for complete search history.

(56) References Cited

U.S. PATENT DOCUMENTS

| | | | | |
|---|---|---|---|---|
| 7,172,209 B2 * | 2/2007 | Totani et al. | ............... | 280/728.2 |
| 7,325,824 B2 * | 2/2008 | Totani et al. | ............... | 280/728.2 |
| 7,384,063 B2 * | 6/2008 | Riester et al. | ............... | 280/730.2 |
| 7,584,989 B2 * | 9/2009 | Heigl et al. | ............... | 280/730.2 |
| 2007/0228702 A1 * | 10/2007 | Ono et al. | ................. | 280/730.2 |
| 2007/0241540 A1 * | 10/2007 | Takemura et al. | ......... | 280/728.2 |

FOREIGN PATENT DOCUMENTS

| | | |
|---|---|---|
| JP | 11301400 A | 11/1999 |
| JP | 2001058555 | 3/2001 |
| JP | 2003237512 A | 8/2003 |
| JP | 2003247517 A | 9/2003 |
| JP | 2005075321 A | 3/2005 |
| JP | 2005280530 A | 10/2005 |
| JP | 2007161139 A | 6/2007 |
| JP | 2007283825 A | 11/2007 |

* cited by examiner

*Primary Examiner* — Faye M. Fleming
*Assistant Examiner* — Drew Brown
(74) *Attorney, Agent, or Firm* — Gifford, Krass, Sprinkle, Anderson & Citkowski, P.C.

(57) ABSTRACT

A vehicle body mount structure for a curtain airbag includes: a curtain airbag disposed on an upper side surface of a cabin of a vehicle and having an airbag body that is deployable to an inside of the cabin; a roof headlining that covers the curtain airbag and that allows the airbag body to be deployed while the roof headlining is undergoing an opening movement; an engagement portion that retains the roof headlining at a predetermined position, and that releases retention of the roof headlining as the airbag body inflates during actuation of the curtain airbag; and a release assist portion that releases the retention effected by the engagement portion as the airbag body inflates during the actuation of the curtain airbag.

7 Claims, 4 Drawing Sheets

VEHICLE BODY MOUNT STRUCTURE OF CURTAIN AIRBAG

INCORPORATION BY REFERENCE

The disclosure of Japanese Patent Application No. 2008-024101 filed on Feb. 4, 2008 including the specification, drawings and abstract is incorporated herein by reference in its entirety.

BACKGROUND OF THE INVENTION

1. Field of the Invention

The invention relates to a vehicle body mount structure for a curtain airbag that is applied to vehicles such as motor vehicles.

2. Description of the Related Art

Some vehicles such as motor vehicles and are equipped with curtain airbags in order to improve safety at the time of a vehicle emergency (in particular, at the time of a side collision). In this kind of curtain airbag, an airbag body is deployably provided on an upper side surface of a cabin. At the time of a vehicle emergency, the airbag body is inflated and deployed to protect an occupant (particularly, a head of the occupant).

At the time of inflation and deployment of the airbag body, a peripheral edge portion of a ceiling inner lining (roof headlining) covering the airbag body during a normal state is pushed widely open to a cabin inner side by the inflation pressure of the airbag body, so that the airbag body is deployed into the cabin (e.g., see Japanese Patent Application Publication No. 2001-58555 (JP-A-2001-58555)).

However, in conjunction with this mount structure for a curtain airbag, there is a problem of complicatedness of the material strength setting of various mounting parts and of the dimensional coordination or adjustment of the mounting parts.

That is, usually, an airbag body is provided deployably on an upper-side surface of the cabin interior, and is covered with a roof headlining, and the roof headlining is retained at a predetermined position by the fitting and latching of resin-made hook nails attached to the roof headlining with metal clips that are attached to the vehicle body. The airbag body is constructed so that at the time of deployment, the airbag body, by its own inflation pressure, bends the roof headlining, and pushes it widely open to a cabin inner side. Therefore, as for the performance of the metal clips and the hook nails that retain and fix the roof headlining at a predetermined position, "pull-apart easiness" is required since there is a need to secure a smooth deployment of an airbag body. On the other hand, during the normal state, since there is a need to securely retain and fix the roof headlining at a predetermined position, "pull-apart difficulty" is required. That is, the metal clips and the hook nails are required to have performances that conflict with each other.

For example, if the strength of the metal clips and the hook nails is set unnecessarily high in order to securely retain and fix the roof headlining at a predetermined position during the normal state, this will become a cause of deterioration of the deployability of the airbag body. On the other hand, if the pull-apart strength of the metal clips and the hook nails is set unnecessarily low, this will become a cause of bumpy movement of the roof headlining and an unusual sound.

Thus, it is complicated and troublesome to set and coordinate or adjust the material strengths of metal clips and the hook nails for retaining and fixing a roof headlining, and related various component parts, or to set and coordinate or adjust the dimensions thereof. Means for resolving this problem has been demanded.

SUMMARY OF THE INVENTION

It is an object of the invention to provide a vehicle body mount structure for a curtain airbag that eliminates the need for the complicated setting of the material strengths of various mounting parts and the complicated dimensional coordination or adjustment of the mounting parts, and that is able to satisfy both the requirement to securely retain a roof headlining that covers a curtain airbag and the requirement to secure a smooth deployment performance of the airbag body, which are conflicting requirements.

A vehicle body mount structure for a curtain airbag in accordance with an aspect of the invention includes: a curtain airbag disposed on an upper side surface of a cabin of a vehicle and having an airbag body that is deployable to an inside of the cabin; a roof headlining that covers the curtain airbag and that allows the airbag body to be deployed while the roof headlining is undergoing an opening movement; an engagement portion that retains the roof headlining at a predetermined position on a vehicle body, and that releases retention of the roof headlining as the airbag body inflates during actuation of the curtain airbag; and a release assist portion that assists releasing of the retention effected by the engagement portion as the airbag body inflates during the actuation of the curtain airbag.

In the curtain airbag mount structure in accordance with the foregoing aspect, the complicated setting of the material strengths of various mounting parts and the complicated dimensional coordination or adjustment of the mounting parts are not necessary. Besides, the provision of the release assist portion makes it possible to satisfy both the requirement to securely retain the roof headlining that covers the curtain airbag and the requirement to secure the smooth deployment performance of the airbag body, which conflict with each other.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, an embodiment of the invention will be described with reference to FIGS. 1 to 4. In each of the drawings, an arrow X shows a direction to a vehicle cabin inner side, and an arrow Y shows a direction to a vehicle cabin outer side.

Figure 1:
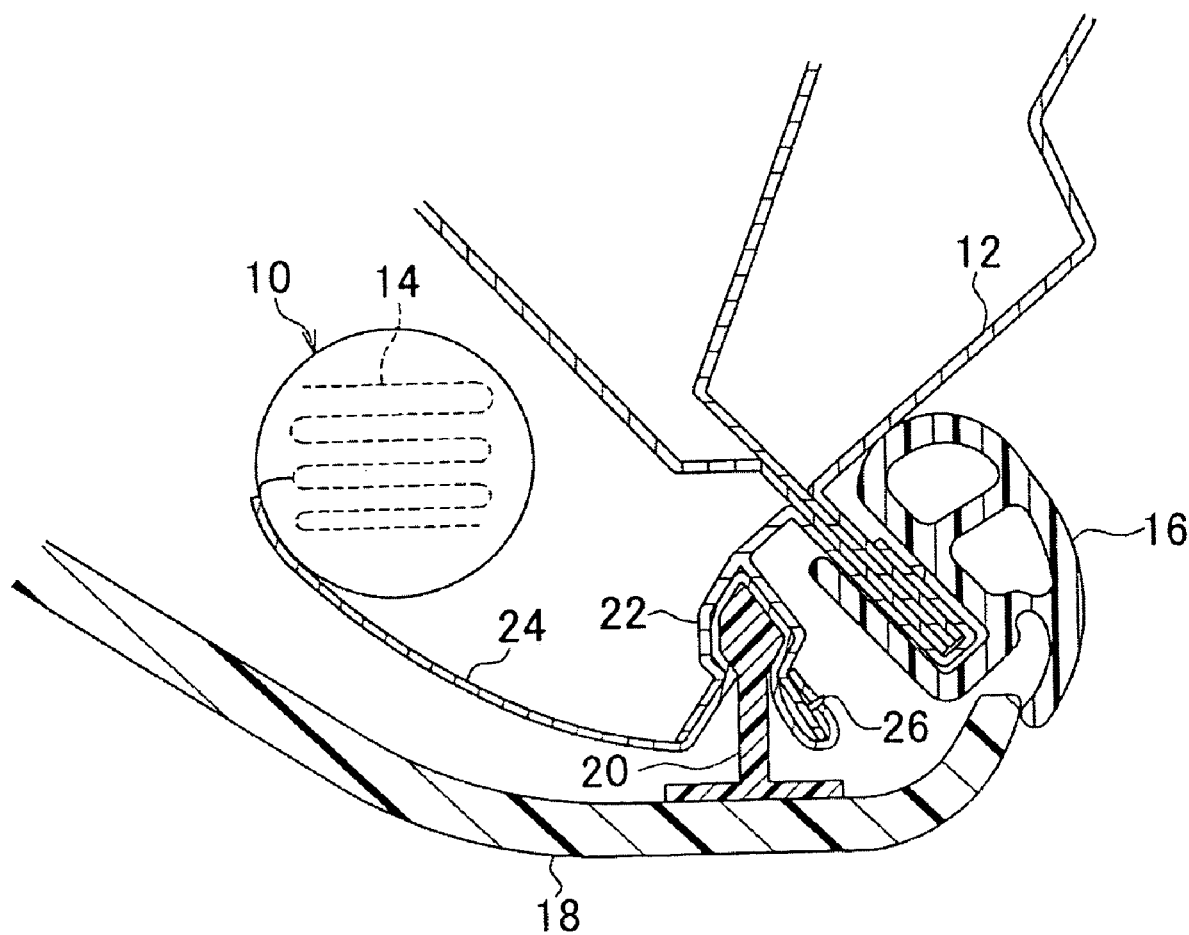
FIG. 1 is a sectional view showing a construction of a curtain airbag and its mount structure in accordance with an embodiment of the invention during a normal state.
Figure 1:

FIG. 1 shows, in a sectional view, a construction of a curtain airbag 10 to which a curtain airbag mount structure in accordance with an embodiment of the invention is applied.

The curtain airbag 10 is disposed near a cabin inner side of a roof side rail 12 that is provided in an upper portion of a cabin of a vehicle. In the curtain airbag 10, an airbag body 14 is provided so as to be deployable. On the other hand, an opening trim 16 is mounted on a lower end edge of a cabin outer side of the roof side rail 12.

Besides, a roof headlining 18 is disposed below the roof side rail 12. An cabin outer-side distal end portion of the roof headlining 18 is provided so as to overlap with a lower end edge of the opening trim 16, thereby covering a lower portion of the curtain airbag 10. Furthermore, the cabin outer-side distal end portion of the roof headlining 18 is movable downward (in such a direction as to move apart from a lower end edge of the opening trim 6 that is provided so as to overlap with the roof lining 18) to an open state, with a cabin innerside portion thereof serving as a pivot. As the roof headlining 18 moves open, it becomes possible to deploy the airbag body 14.

Beside, a protruded shape hook nail 20 that constitutes an engagement portion is mounted at an inward side (reverse surface side) of the roof headlining 18. For example, the hook nail 20 is made of a resin. The hook nail 20 extends upward from the reverse surface side of the roof headlining 18, and corresponds to a metal clip 22 that constitutes an engagement portion.

A main portion of the metal clip 22 has a recessed shape that is an inverted V shape in a sectional view. The metal clip 22 is fixed to a lower end edge of the roof side rail 12 on which the opening trim 16 is mounted and which constitutes a portion of the vehicle body. Specifically, due to the hook nail 20 being fittingly latched to the metal clip 22, the roof headlining 18 is retained at a predetermined position (such a position as to cover the curtain airbag 10) during a normal state, in such a construction that at the time of actuation of the curtain airbag 10, as the airbag body 14 inflates, the hook nail 20 is pulled out from the metal clip 22, releasing the retention of the roof headlining 18.

Furthermore, the metal clip 22 is provided with a flexible draw-out cloth 24 as a release assist portion or a linkage member. An end of the draw-out cloth 24 is retained to a latch projection 26 that constitutes a latch portion that is projected from the metal clip 22, by hooking, on the latch projection 26, a latch opening that is provided in a cabin outer-side distal end portion of the draw-out cloth 24. Specifically, in this construction, the hook nail 20 is fitted in the metal clip 22, with the draw-out cloth 24 interposed therebetween. Besides, another end portion of the draw-out cloth 24 is directly linked or connected to a portion of the airbag body 14 of the curtain airbag 10 which is at a position on a cabin inner side and on an upper side of the airbag body 14 in an up-down direction during a deployed state of the airbag body 14. Therefore, when the airbag body 14 inflates, the inflation of the airbag body 14 pulls the draw-out cloth 24. Then, as the draw-out cloth 24 is extended, the tension of the draw-out cloth 24 subsidiarily produces a downward force that pulls the hook nail 20 out from the metal clip 22 (i.e., that assists in releasing the retention of the roof headlining 18 effected by the metal clip 22 and the hook nail 20). The distal end portion of the draw-out cloth 24 hooked on the latch projection 26 is pre-set so that during the inflation of the airbag body 14, the distal end portion ruptures and falls apart from the latch projection 26 without affecting any other component or the like.

Operation and effects of this embodiment will be described below.

In the curtain airbag 10 and its mount structure constructed as described above, the airbag body 14 is deployably housed in an upper side surface of a vehicle cabin, and is covered by the roof headlining 18, and the roof headlining 18 is retained at a predetermined position by the hook nail 20 being fittingly latched to the metal clip 22 during the normal state (the state illustrated in FIG. 1).

At the time of deployment of the airbag body 14, as the airbag body 14 inflates, the fitting between the metal clip 22 and the hook nail 20 is removed, and the retention of the roof headlining 18 is released, so that the opening movement of the roof headlining 18 becomes possible. Furthermore, due to the inflation of the airbag body 14, the airbag body 14 deploys into the vehicle cabin while the roof headlining 18 is widely opened to the cabin inner side, that is, the opening movement thereof progresses.

Figure 2:
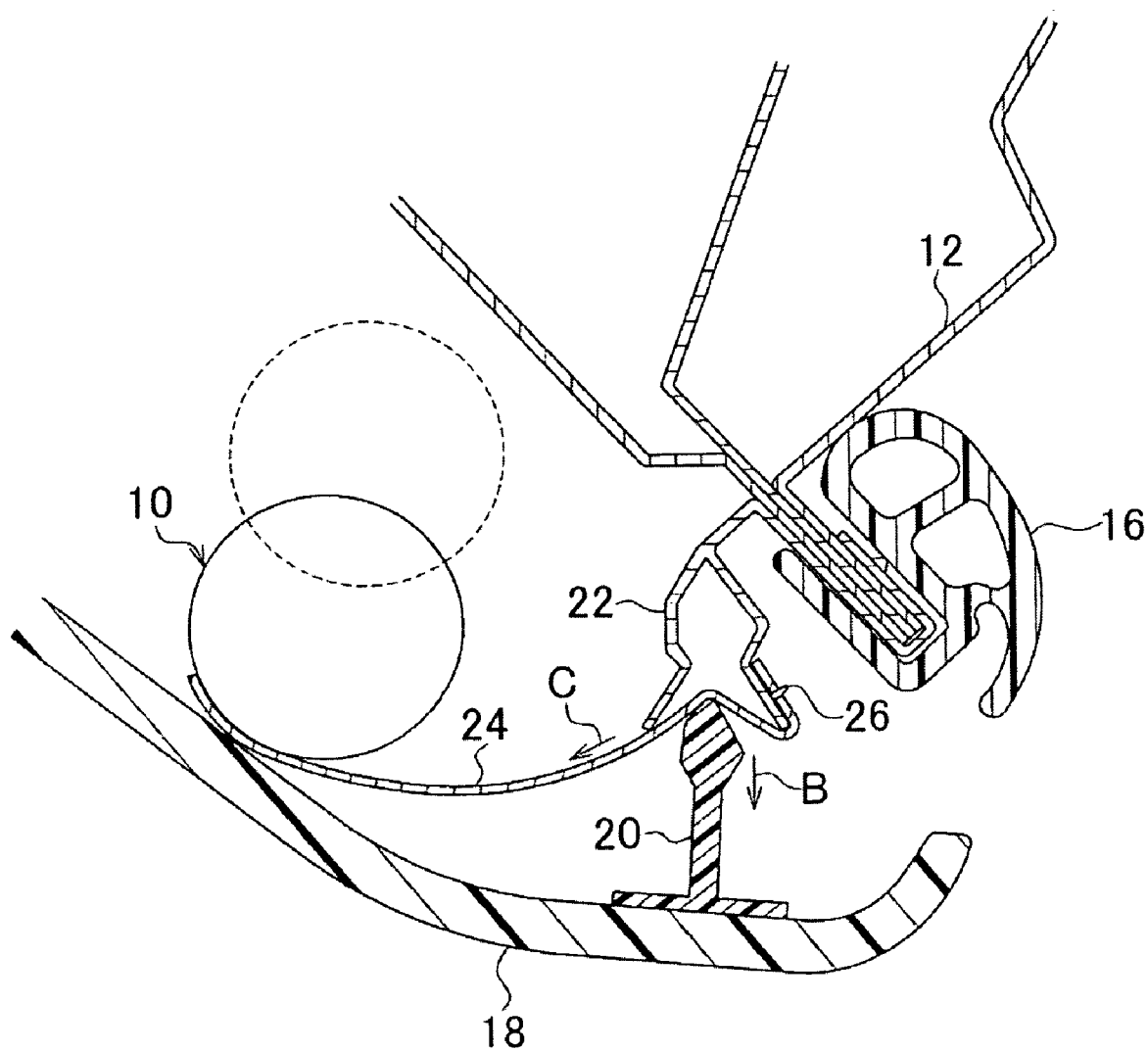
FIG. 2 is a sectional view showing a construction of the curtain airbag and its mount structure in accordance with the embodiment of the invention, during an early period of the deployment of an airbag body.

Furthermore at this stage, the metal clip 22 and the hook nail 20 in this curtain airbag 10 that retain and fix the roof headlining 18 at the predetermined position during the normal state undergo a movement in which the hook nail 20 comes out from the metal clip 22 at the time of deployment of the airbag body 14, thereby releasing the retention of the roof headlining 18. At this time (during an early period of the deployment), in addition to the release of the retention, the force produced in a push-down direction by the inflation of the airbag body 14 is transmitted to the draw-out cloth 24, whereby the draw-out cloth 24 is pulled in the direction of an arrow C, as shown in FIG. 2. In this movement, since an end of the draw-out cloth 24 is latched and thus retained to the latch projection 26 as well and the other end of the draw-out cloth 24 is linked to the airbag body 14, a force that pushes the hook nail 20 downward occurs on the hook nail 20 due to the tension produced in the draw-out cloth 24 sandwiched between the metal clip 22 and the hook nail 20 when the draw-out cloth 24 is extended; thus, a force is subsidiarily given to the hook nail 20 in a direction of an arrow B so that the hook nail 20 comes out of the metal clip 22. That is, as the draw-out cloth 24 is pulled, the force to release the retention of the roof headlining 18 effected by the metal clip 22 and the hook nail 20 is forcibly supplemented, so that the hook nail 20 comes out of the metal clip 22.

Figure 3:
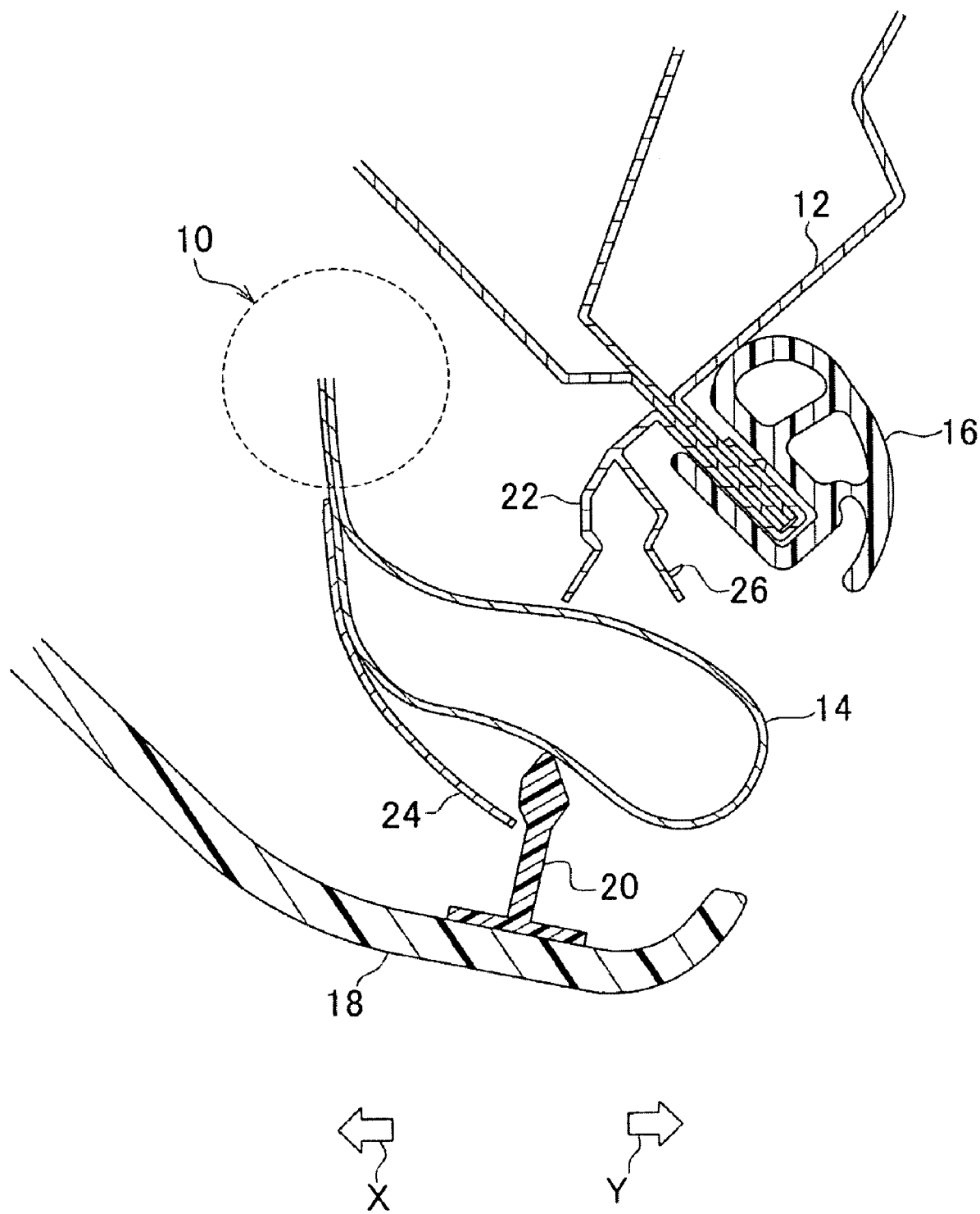
FIG. 3 is a sectional view showing a construction of the curtain airbag and its mount structure in accordance with the embodiment of the invention, during an intermediate period of the deployment of the airbag body.

During an intermediate period of the deployment of the airbag body 14, while the deployment of the airbag body 14 progresses as shown in FIG. 3, the distal end portion of the draw-out cloth 24 hooked on the latch projection 26 ruptures and falls apart therefrom to become a free end.

Figure 4:
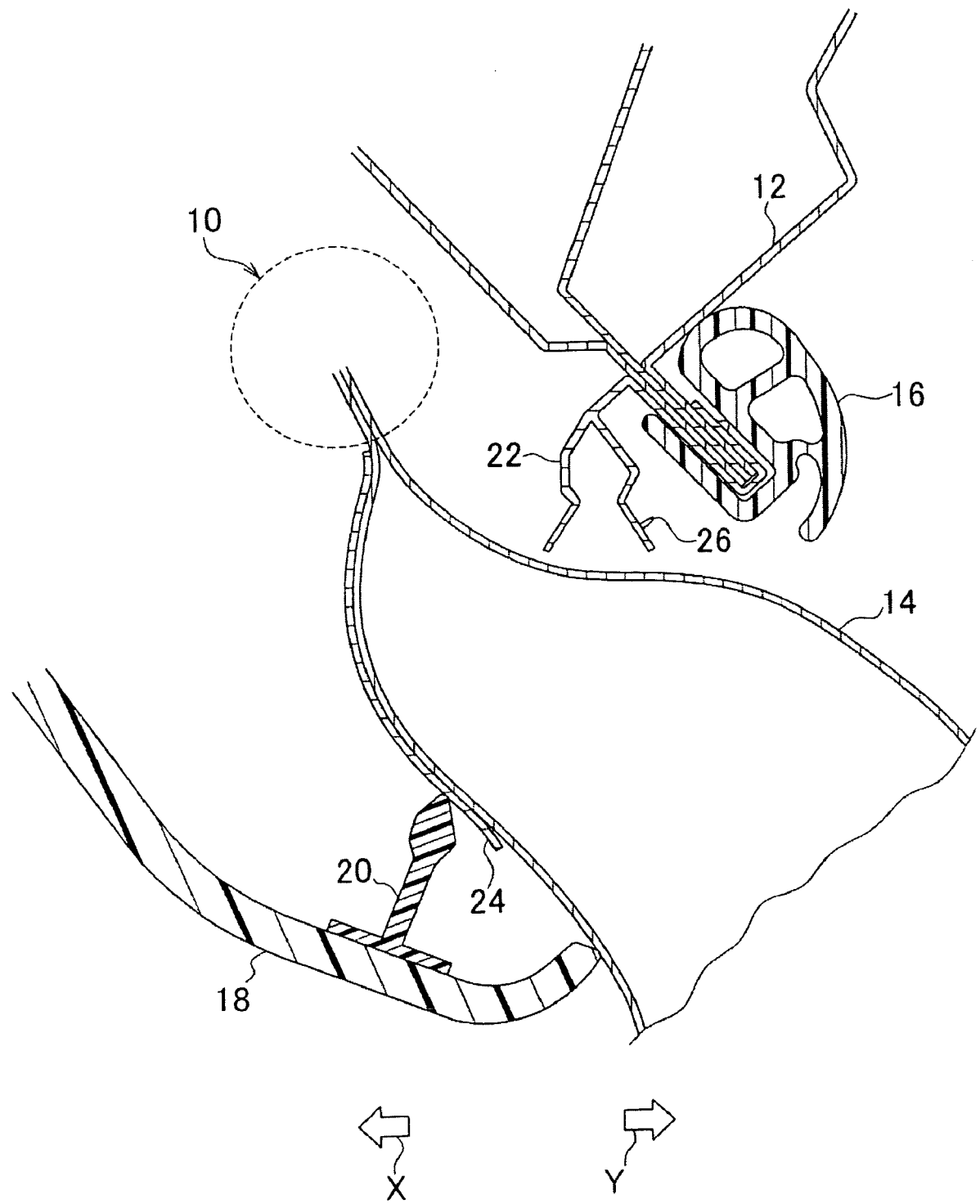
FIG. 4 is a sectional view of the curtain airbag and its mount structure in accordance with the embodiment of the invention at the time of completion of the deployment of the airbag body.

Furthermore, at the time point at which the deployment of the airbag body 14 is completed as shown in FIG. 4, the hook nail 20, together with the roof headlining 18, separates far from the metal clip 22, so that the airbag body 14 smoothly completes its deployment.

Thus, at the time of deployment of the airbag body 14, the draw-out cloth 24 assists the action of releasing the retention effected by the metal clip 22 and the hook nail 20, thereby facilitating the opening movement of the roof headlining 18. Therefore, the airbag body 14 accordingly deploys in a smooth manner.

That is, the metal clip 22 and the hook nail 20 as engagement portions are required to have large retaining force that securely retains and fixes the roof headlining 18 at a predetermined position (i.e., so-called "pull-apart difficulty") during the normal state, and are also required to have a characteristic of quickly releasing the retention (a so-called "pull-apart easiness") during the deployment of the airbag body 14. Even if the metal clip 22 and the hook nail 20 (the engagement portions) are pre-set to have such a large retention force (a so-called "pull-apart difficulty") as to securely retain and fix the roof headlining 18 during the normal state, the actuation of the draw-out cloth 24 (the release assist portion or linkage member) at the time of deployment of the airbag body 14 subsidiarily gives a force to the hook nail 20 so that the hook nail 20 comes out of the metal clip 22 (i.e., the action of the draw-out cloth 24 improves the so-called "pull-apart easiness"), so that the retention is quickly released. Therefore, the opening movement of the roof headlining 18 becomes easy, and the smooth deployment characteristic of the airbag body 14 can be secured. Besides, since the distal end portion of the draw-out cloth 24 hooked on the latch projection 26 ruptures and falls apart therefrom to become a free end, the draw-out cloth 24 does not inhibit the deployment of the airbag body 14. Thus, the smooth deployment characteristic of the airbag body 14 can be secured. Besides, since an end of the draw-out cloth 24 is directly linked to the airbag body 14, it suffices to merely attach a curtain airbag assembly to the vehicle body, such as, the roof side rail 12 or the like, that is, there is no need to provide a process of separately attaching the end of the draw-out cloth 24 to the vehicle body, such as the roof side rail 12 or the like. Therefore, the attaching operability is good.

Thus, in the curtain airbag 10 and its mount structure in accordance with this embodiment, the complicated setting of the material strengths of various mounting parts and the complicated dimensional coordination or adjustment of the mounting parts are unnecessary. Besides, the provision of the draw-out cloth 24 makes it possible to satisfy both the requirement to securely retain the roof headlining 18 that covers the curtain airbag 10 and the requirement to secure the smooth deployment performance of the airbag body 14, which conflict with each other.

Moreover, due to the construction that has the metal clip 22 and the hook nail 20 as engagement portions and the construction in which the draw-out cloth 24 is applied as a release assist portion, the curtain airbag 10 and its mount structure of the embodiment can be realized in a simple structure.

Incidentally, although the foregoing embodiment has been described in conjunction with a construction in which the draw-out cloth 24 is provided as a release assist portion or linkage member, the release assist portion or linkage member is not limited so. On the contrary, the release assist portion may be constructed by other similar members, for example, a thread, a string, a belt, etc. In this case, too, substantially the same operation and effects of the draw-out cloth 24 in the foregoing embodiment can be obtained. Besides, while in the foregoing embodiment, an end of the draw-out cloth 24 is directly linked to the airbag body 14, the position of the linkage is not limited so. For example, the end of the draw-out cloth 24 may be fixed to the vehicle body, for example, the roof side rail 12 located above the airbag body 14, or the like. That is, the position of the linkage may be any position as long as it is possible to take a position that passes through a space below the airbag body 14 so as to allow the deploying force of the airbag body 14 to be transmitted to the draw-out cloth 24. Besides, although the foregoing embodiment has been described in conjunction with a construction in which the latch projection 26 as a latch portion is provided on the metal clip 22, the latch projection 26 may be provided at any position as long as the end of the draw-out cloth 24 latched on the latch projection 26 is retained until the end of the draw-out cloth 24 ruptures during the transition of the draw-out cloth 24 from a bent state to a stretched state. For example, the latch projection 26 may be provided at a position on an inner side of the hook nail 20 in the vehicle width direction, a reverse side of the roof headlining 18 on the inner side of the hook nail 20 in the vehicle width direction, the opening trim 16, etc. Besides, in the foregoing embodiment, the hook nail 20 as a projected portion of the engagement portion is provided on the roof headlining 18, and the metal clip 22 as a recessed portion of the engagement portion is provided on the vehicle body side. However, the projected portion may also be provided on the vehicle body side, with the recessed portion provided on the roof headlining 18. With respect to other features and the like, the invention is not limited by the contents described above in conjunction with the embodiment.

What is claimed is:

1. A vehicle body mount structure for a curtain airbag, comprising:
   a curtain airbag disposed on an upper side surface of a cabin of a vehicle and having an airbag body that is deployable to an inside of the cabin;
   a roof headlining that covers the curtain airbag and that allows the airbag body to be deployed while the roof headlining is undergoing an opening movement;
   an engagement portion that retains the roof headlining at a predetermined position on a vehicle body, and that releases retention of the roof headlining as the airbag body inflates during actuation of the curtain airbag; and
   a release assist portion that assists releasing of the retention effected by the engagement portion as the airbag body inflates during the actuation of the curtain airbag
   wherein the engagement portion has:
   a metal clip mounted on the vehicle body; and
   a hook nail that is mounted on the roof headlining and that fittingly latches to the metal clip, and
   wherein the release assist portion is a draw-out cloth, an end of which is mounted on the airbag body and another end of which is caught and latched between the metal clip and the hook nail that are fitted to each other.

2. A vehicle body mount structure for a curtain airbag, comprising:
   a curtain airbag disposed on an upper side surface of a cabin of a vehicle and having an airbag body that is deployable to an inside of the cabin;
   a roof headlining that covers the curtain airbag and that allows the airbag body to be deployed while the roof headlining is undergoing an opening movement;
   an engagement portion that retains the roof headlining at a predetermined position on a vehicle body, and whose retention of the roof headlining is released as the airbag body inflates during actuation of the curtain airbag; and
   a linkage member that is retained at a site in the linkage member that is relatively close to the airbag body and at a site in the linkage member that is relatively close to the engagement portion, while the roof headlining is engaged with the vehicle body,
   wherein the linkage member assists release of the retention by the engagement portion by transmitting an inflation force of the airbag body to a side of the roof headlining via the linkage member during actuation of the curtain airbag.

3. The vehicle body mount structure for the curtain airbag according to claim 2,
   wherein the site in the linkage member that is relatively close to the airbag body is directly linked to the airbag body.

4. The vehicle body mount structure for the curtain airbag according to claim 2, further comprising a latch portion provided near the engagement portion,
wherein one end side of the linkage member is retained at a position of the engagement portion while the roof headlining is engaged with the vehicle body, and another end side of the linkage member is linked to a side of the airbag body, and a portion of the linkage member that is closer to the one end side than the position of the engagement portion is rupturably latched to the latch portion.

5. The vehicle body mount structure for the curtain airbag according to claim 2,
wherein the engagement portion includes a first engagement portion that is fixed to the roof headlining, and a second engagement portion that is fixed to the vehicle body and engages with the first engagement portion, and
wherein one end side of the linkage member is retained to the engagement portion by being sandwiched between the first engagement portion and the second engagement portion, and another end side of the linkage member is linked to the site that is relatively close to the airbag body.

6. The vehicle body mount structure for the curtain airbag according to claim 5,
further comprising a latch portion provided near the engagement portion,
wherein a portion of the linkage member that is closer to the one end side of the linkage member than a portion of the linkage member that is sandwiched by the first engagement portion and the second engagement portion is rupturably latched.

7. The vehicle body mount structure for the curtain airbag according to claim 5,
wherein the linkage member is a flexible member, and
wherein one of the first engagement portion and the second engagement portion is a projected portion, and another one of the first engagement portion and the second engagement portion is a recessed portion, and
wherein the linkage member is sandwiched in a bent state when the projected portion and the recessed portion are engaged.

* * * * *